E. W. TUCKER.
AUTOMATIC BRAKE FOR TRUCKS.
APPLICATION FILED JULY 7, 1916.
1,273,692.
Patented July 23, 1918.
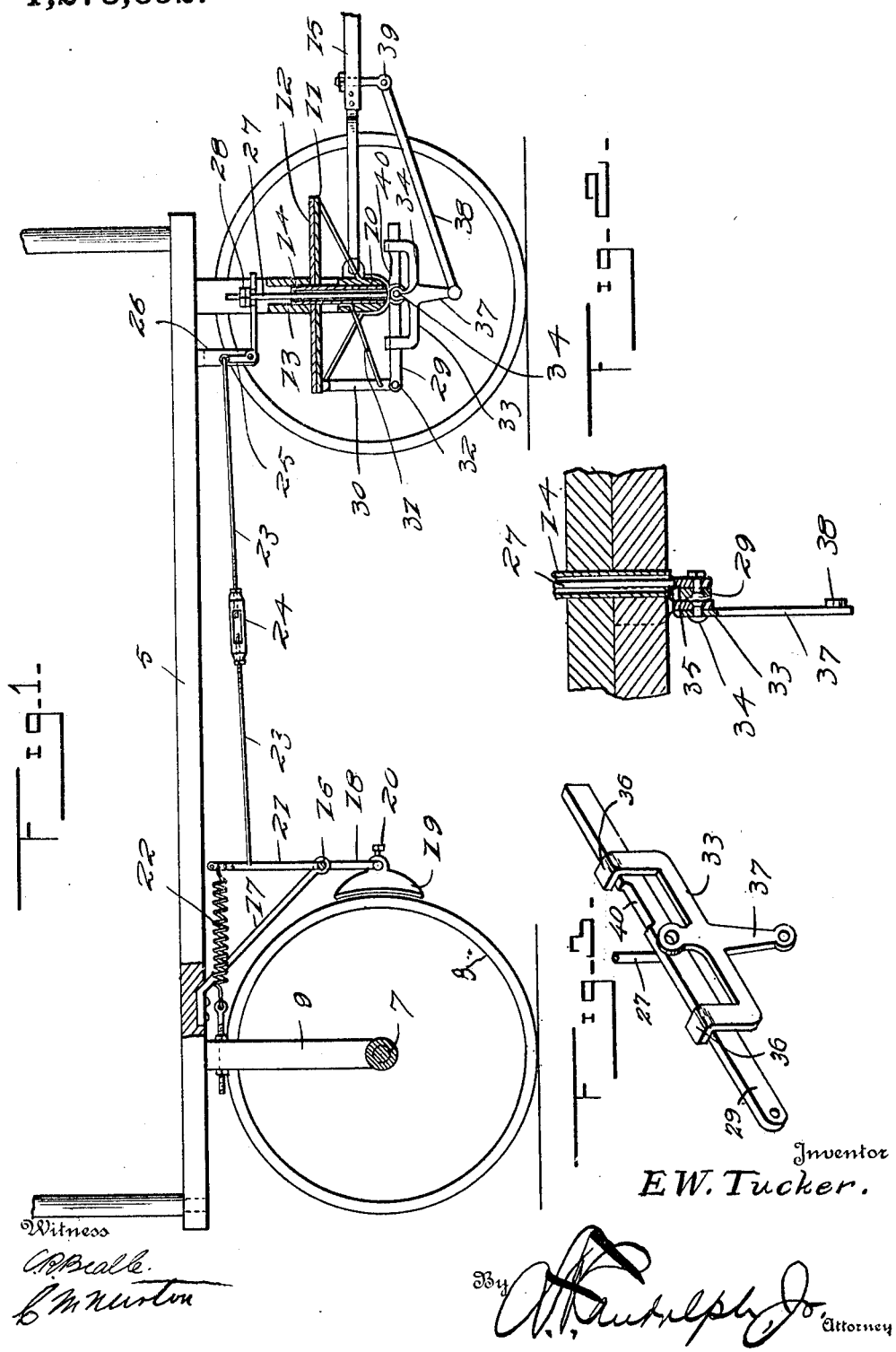
Inventor
E. W. Tucker.

UNITED STATES PATENT OFFICE.

EDWIN W. TUCKER, OF NORTH PRAIRIE, WISCONSIN.

AUTOMATIC BRAKE FOR TRUCKS.

1,273,692.   Specification of Letters Patent.   Patented July 23, 1918.

Application filed July 7, 1916.   Serial No. 107,999.

*To all whom it may concern:*

Be it known that I, EDWIN W. TUCKER, a citizen of the United States, residing at North Prairie, in the county of Waukesha and State of Wisconsin, have invented certain new and useful Improvements in Automatic Brakes for Trucks; and I do hereby declare the following to be a full, clear, and exact description of the invention, such as will enable others skilled in the art to which it appertains to make and use the same.

This invention relates to improvements in automatic brakes of that type which are particularly adapted for use in connection with baggage and other trucks.

The invention has for its object to provide means operable automatically by the handle or tongue of the truck when the latter is moved either upwardly or downwardly out of a horizontal position to automatically set the brakes of the truck and thus prevent the latter from moving.

With this and other objects in view, the invention consists in the novel construction, combination and arrangements of parts as will be hereinafter specifically described, claimed and illustrated in the accompanying drawing, in which:

Figure 1 represents a longitudinal sectional view through a baggage truck, illustrating the automatic brake applied thereto.

Fig. 2 represents a fragmentary vertical sectional view through the front bolster, taken at right angles to Fig. 1, and Fig. 3 represents a perspective view of a part of the brake mechanism detached.

Referring to the drawing in detail, wherein similar reference numerals designate corresponding parts throughout the several views, the numeral 5 indicates the platform of a well known type of baggage truck, which includes a rear axle 7 carrying the wheels 8. The rear axle 7 is connected with the platform 5 by a bolster 9 and axle spindles (not shown) are secured to and carried by the lower bolster 10, and support the front wheels. The lower bolster 10 carries the lower member 11 of a fifth wheel, the upper part 12 of which is carried by the upper bolster 13, which latter is secured to the front end of the platform 5. A hollow tubular king bolt 14 is inserted through the vertically alined apertures in the upper and lower bolsters 13 and 10. The handle or tongue 15 is pivotally connected with the lower bolster and may be utilized in the usual manner for propelling the truck.

The improved automatic brake includes a rotatable brake beam 16, supported in brackets 17 secured to and depending from the platform 5. The opposite ends of the shaft or beam 16 are directed downwardly and outwardly, as indicated at 18 and support brake shoes 19, adapted to engage the rear wheels 7 to retard the travel of the truck. The brake shoes 19 are secured in adjusted position upon the angular terminals of the beam 16 by set screws 20. Intermediate the brackets 17 the shaft 16 is formed with an upstanding arm 21, having connection with a coil spring 22, which latter is also connected with the rear bolster 9 and normally retains the brake shoes 19 in inoperative position.

The rear end of a connecting rod 23 is adjustably connected with the upper portion of the arm 21 and is preferably connected in two sections, which are connected by a turn-buckle 24, whereby the length of the connecting rod may be varied to compensate for wear of the brake shoes 19 and also to adapt the automatic brakes for trucks of various sizes. The forward terminal of the connecting rod 23 is pivotally connected with the vertical arm of a bell crank 25, which is supported in a depending bracket 26 carried by the platform 5. The horizontal arm of the bell crank 25 is formed with a longitudinal slot receiving the upper terminal of a second connecting rod 27, on which are fitted adjustable nuts 28 constituting stops for engaging the slotted arm of the bell crank 25.

The connecting rod 27 extends downwardly through the hollow king bolt 14 and is pivotally connected at its lower terminal with a horizontally disposed bar 29. A depending supporting arm 30 is connected with the lower member 11 of the fifth wheel, is connected with the lower bolster 10 by a brace 31, and is pivotally secured at 32 to the rear terminal of the bar 29.

A lever 33 is pivotally secured at 34 to a bracket 35 attached to the lower bolster 10, and is formed with angularly directed terminals 36, which are engaged upon the bar 29. The lever 33 is formed centrally with a depending arm 37, which is connected by a connecting rod 38 with a pin or bolt 39 attached to the pivoted tongue 15.

A stop shoulder 40 is formed upon the upper edge of the bar 29 at a point adjacent the pivotal axis of the lever 33.

As clearly shown in Fig. 1, the connecting rod 38 is of such length that when the handle 15 is moved to horizontal position, or that position which is ordinarily assumed when the truck is being drawn, the lever 33 is retained in a horizontal position, permitting the bar 29 to be elevated by the pull exerted by the spring 22 through the connecting rod 23, belt crank 25 and connecting rod 27. When the bar 29 is in elevated position the brakes 19 are retained in spaced relation to the rear wheels of the truck. However, when the handle 15 is moved upwardly or downwardly out of a horizontal position, the lever 33 is tilted upon its pivotal axis 34, thereby moving one of the angular terminals 36 thereof against the upper edge of the bar 29, depressing the latter and effecting a longitudinal pull upon the connecting rods 27 and 23, oscillating the shaft 16 and automatically applying the brake shoes 19 to the rear wheels, and consequently retarding the movement of the truck. After the brake shoes have been applied to the rear wheels, by downward movement of the tongue, further downward movement of the tongue is limited by engagement of the angular terminal 36 of the lever 33 with the stop shoulder 40, which prevents sliding movement of the angular terminal 36 over the lever 33 and consequently locks the tongue at a predetermined point during its downward movement, thereby preventing injury to the brake mechanism caused by undue downward pressure exerted upon the tongue.

What I claim is:

1. In combination, a truck including a platform, front and rear supporting wheels therefor, relatively movable upper and lower bolsters connecting the front wheels with said platform, a tongue connected with the lower bolster, a bar pivotally secured to the lower bolster, means operable by said tongue to depress said bar, brake shoes movable against the rear wheels of the truck, and means connecting said bar with said brake shoes for automatically applying the latter.

2. In combination, a truck including a platform, supporting wheels therefor, brake shoes associated with said supporting wheels, a pivoted bar, means connecting said bar with said brake shoes, a pivoted tongue connected with the truck, means connecting said tongue with said pivoted bar for depressing the latter to automatically apply the brake shoes to the wheels, and means carried by the pivoted bar for engaging the means connecting the tongue and the pivoted bar, when the brake shoes are applied for limiting the downward movement of the tongue.

3. In combination, a truck including a platform, front and rear supporting wheels therefor, relatively movable upper and lower bolsters connecting the front wheels with said platform, a pivoted tongue, a bar pivotally secured to the lower bolster, a stop shoulder on said bar, a U-shaped member pivotally secured to the lower bolster having angular terminals overlying said pivoted bar, and means connecting said U-shaped member with said tongue for depressing the bar during swinging movement of the tongue, said U-shaped member being adapted to engage said shoulder to limit the downward movement of the tongue.

In testimony whereof I affix my signature in presence of two witnesses.

EDWIN W. TUCKER.

Witnesses:
C. H. BRISLET,
GILBERT MASON.

Copies of this patent may be obtained for five cents each, by addressing the "Commissioner of Patents, Washington, D. C."